United States Patent [19]

Kleinknecht et al.

[11] 4,141,780
[45] Feb. 27, 1979

[54] OPTICALLY MONITORING THE THICKNESS OF A DEPOSITING LAYER

[75] Inventors: Hans P. Kleinknecht, Bergdietikon; James Kane, Zumikon, both of Switzerland

[73] Assignee: RCA Corporation, New York, N.Y.

[21] Appl. No.: 862,189

[22] Filed: Dec. 19, 1977

[51] Int. Cl.² .......................................... H01L 21/306
[52] U.S. Cl. .................... 156/626; 156/659; 156/662; 356/138; 356/357; 427/10
[58] Field of Search ............... 356/108, 144, 152, 138; 427/9, 10; 156/626, 659, 662; 350/162 R

[56] References Cited

U.S. PATENT DOCUMENTS

| | | | |
|---|---|---|---|
| 3,211,570 | 10/1965 | Salisbury | 427/10 |
| 4,039,370 | 8/1977 | Kleinknecht | 356/152 X |
| 4,073,964 | 2/1978 | Herrmann | 156/626 X |

*Primary Examiner*—William A. Powell
*Attorney, Agent, or Firm*—H. Christoffersen; D. S. Cohen; T. H. Magee

[57] ABSTRACT

A method of optically monitoring the thickness of a layer of material being deposited on a substrate within a reaction chamber comprises forming on a body a diffraction grating profile, exposing the grating profile to a beam of light while depositing the material on both the substrate and the grating profile, whereby the grating profile functions as a relief pattern diffracting the light beam into diffracted beams of various orders, measuring the intensity of the first order ($I_1$) and second order ($I_2$) beams to obtain a ratio signal ($I_2/I_1$), and then transmitting the ratio signal to processing means for determining the aspect groove width of the relief pattern, whereby the thickness of the depositing layer is determined from a pre-established relationship dependent upon the aspect groove width.

8 Claims, 4 Drawing Figures

OPTICALLY MONITORING THE THICKNESS OF A DEPOSITING LAYER

This invention relates to a technique for optically monitoring the thickness of a layer of material being deposited on a substrate within a reaction chamber.

In manufacturing integrated circuit devices, there are many applications where it is desirable to monitor the growth rate of silicon layers during growth by an optical technique. At present, this is done in silicon-on-sapphire (SOS) technology and for the growth of polycrystalline silicon on silicon dioxide by an interference method that makes use of the step in refractive index at the silicon-sapphire or silicon-SiO$_2$ interface. However, the problem is far more severe for the epitaxial growth of silicon on silicon because of the high growth temperature of about 1100° C. and the absence of an index step due to the strong thermal generation of carriers.

At present the only parameters which are controlled during epitaxial deposition are the temperature, which is about 1100° C. and measured with an optical pyrometer, and the gas flow rates. The layer thickness can not be readily determined during the process; it is controlled strictly by terminating the process at a suitable time as calculated from empirical growth rates. The location of the various doping steps and PN junctions within an epitaxial layer are similarly controlled; again, empirical growth rates are used to turn the doping gases on and off during the layer growth. Within this present state of the art, the epitaxial layer thickness can be measured only after completion of the growth process at room temperature by an infrared interference technique. The doping distribution is determined destructively on control wafers by angle lapping and two-point probing.

In order to avoid the aforementioned problems, the present method gives a continuous measurement of the actual layer thickness during growth, allowing one to change the doping gas at exactly the desired growth thickness and to terminate the growth at exactly the prescribed total thickness, independent of small variations in the temperature and in the gas flow rate. The present technique gives signals in terms of amplitudes, not maxima or minima, which can easily be interfaced with a computer for an active, automatic control of the deposition process.

In depositing a layer of material onto a substrate, such as chemically vapor-depositing (CVD) an epitaxial layer of silicon onto a silicon wafer, the material exhibits a strong tendency to deposit conformally. In other words, while performing CVD epitaxy over a relief structure in a silicon wafer, the silicon is deposited, to a first approximation, with uniform thickness. Thus, when depositing material onto a periodic relief pattern, due to conformal lateral "growth", the aspect ratio and/or the modulation depth are changed during deposition. To a light beam reflected from the surface thereof, such a periodic relief pattern acts as a reflection phase grating. Consequently, by monitoring the diffracted light from a laser beam incident on this periodic structure during the actual deposition process, the profile of the surface and, indirectly, the epitaxial layer thickness can be measured. Using this principle, the present invention provides a novel method of optically monitoring the thickness of a material being deposited on a silicon wafer within a reaction chamber.

Figure 1:
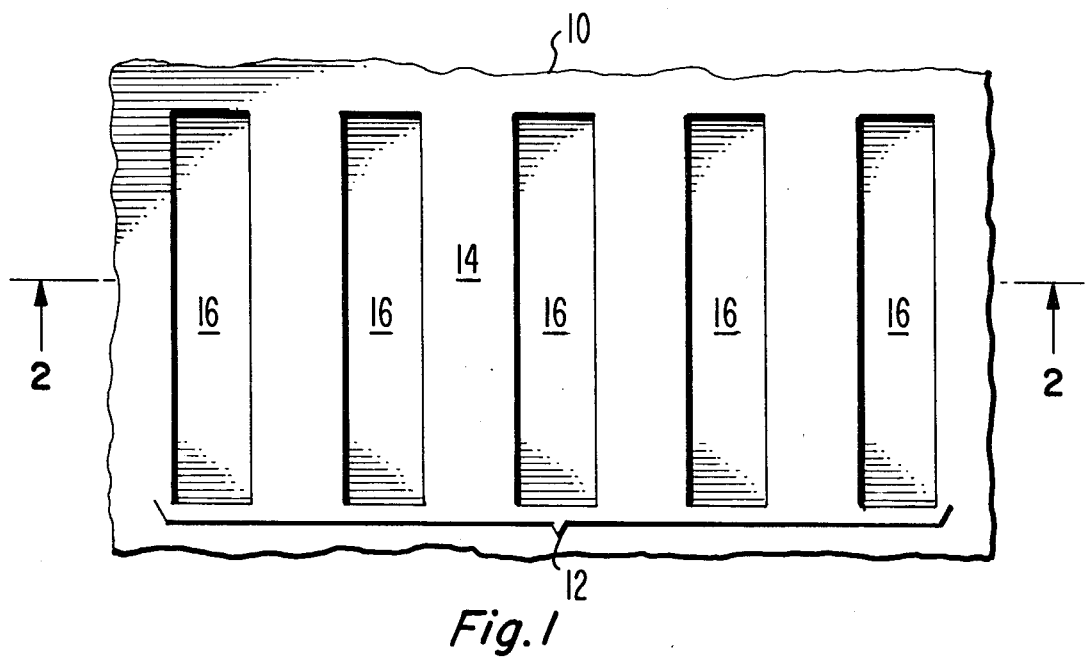
FIG. 1 is a plan view showing one embodiment of a diffraction grating profile utilized in the present novel method.
Figure 2:
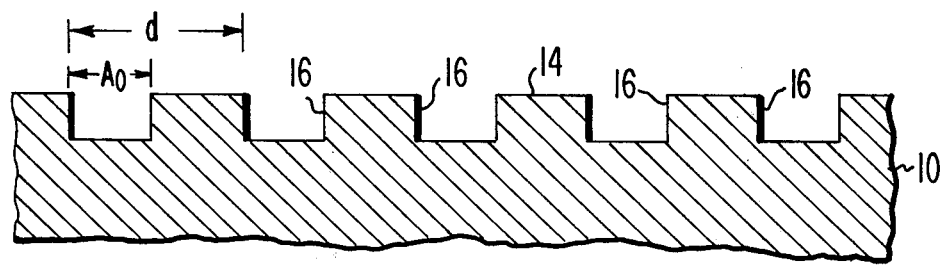
FIG. 2 is a cross-sectional view taken along line 2—2 of FIG. 1.

Referring to FIGS. 1 and 2 of the drawings, the first step of the present method comprises forming on a body 10 a diffraction grating profile 12 having an aspect groove width A$_o$ and a periodicity d. In the present embodiment, the diffraction grating profile 12 comprises a periodic rectangular relief pattern. Preferably, the body 10 comprises an unused knock-out portion in the middle of the silicon wafer upon which the epitaxial layer is being deposited. The diffraction grating profile 12 may be formed by photolithographically masking a surface 14 of the silicon wafer and etching rectangular grooves 16 therein, as shown in FIG. 2. The grooves have a typical depth of about 1 to 10 micrometers, a periodicity d and a groove width A$_o$; the value of the groove width A$_o$ should be at least twice as large as the value of the thickness of the layer being optically monitored.

Figure 3:
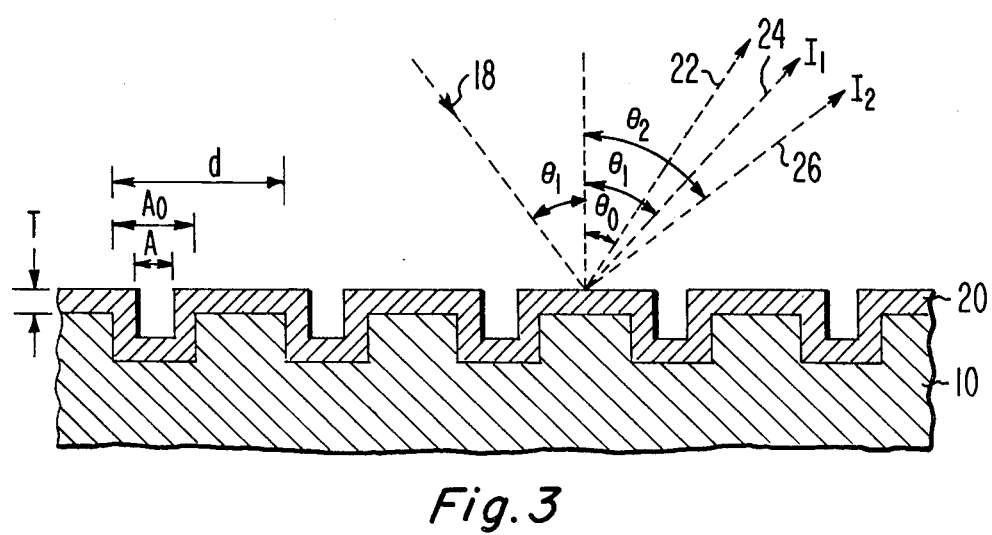
FIG. 3 is the cross-sectional view shown in FIG. 2 further illustrating diagrammatically a beam of light striking the diffraction grating profile and being diffracted into diffracted beams of the zero, first, and second orders.

Referring to FIG. 3, the diffraction grating profile 12 is exposed to a beam 18 of monochromatic light while depositing the material, silicon in the present example, on the silicon wafer and diffraction grating profile 12 in a reaction chamber. The diffraction grating profile 12, including the material depositing thereon in the form of an epitaxial layer 20, functions as a relief pattern, diffracting the beam 18 of light, typically a laser beam, into a diffraction spectrum including a zero order beam 22, a first order beam 24, and a second order beam 26. As the silicon material deposits on the relief pattern, the aspect groove width A thereof continually changes, resulting in a change in the intensity of the diffracted beams as further explained below.

In the present embodiment, the light beam 18 has a diameter of approximately five (5) millimeters and strikes the diffraction grating profile 12 uniformly, so that all portions thereof are uniformly exposed to the incident light beam 18. The use of a He-Ne gas laser (2mW) having a wavelength, $\lambda$, equal to 0.6328 micrometers is preferred due to the fact it is relatively cheap, reliable, and convenient to use; its wavelength can be easily detected by a silicon diode or phototransistor. The relief pattern illustrated in FIG. 3 is utilized as a reflection phase grating wherein the grating diffracts the incident light beam 18 into diffracted beams of various orders whose intensities are dependent upon the resulting interference of different reflected and diffracted light rays. The angular positions of the various diffracted orders depend only on the grating period, d, and on the wavelength, $\lambda$. The diffraction angle, $\theta$, for a diffraction grating is a function of $\lambda$ and d according to the following expression:

$$\sin \theta = \sin \theta_I + m\lambda/d$$

where $\theta_I$ is the angle of the incident light beam 18, as shown in FIG. 3, d is the periodicity, and m is the diffraction order. In the present embodiment, the first and second order diffracted beams 24 and 26 are utilized, where m is equal to 1 and 2, respectively. The above equation then becomes:

$$\mathrm{Sin}\, \theta_1 = \mathrm{Sin}\, \theta_I + \lambda/d$$

$$\mathrm{Sin}\, \theta_2 = \mathrm{Sin}\, \theta_I + 2\lambda/d$$

where $\theta_1$ and $\theta_2$ are the diffraction angles for the first and second order beams 24 and 26, respectively, as shown in FIG. 3. Utilizing a laser beam which strikes the diffraction grating profile 12 uniformly at an angle perpendicular to the plane of the diffraction grating profile 12 and which has a wavelength, $\lambda$, equal to 0.6328 micrometers, one will obtain, for a diffraction grating having a periodicity equal to 100 micrometers, a first order diffraction angle, $\theta_1$, equal to about 0.36° and a second order diffraction angle, $\theta_2$, equal to about 0.73°. For a $CO_2$ laser, having a wavelength equal to about 10 micrometers, (which, however, would require a different kind of detectors) one will obtain a first order diffraction angle, $\theta_1$, equal to about 5.8° and a second order diffraction angle, $\theta_2$, equal to about 11.6°. One can expect that good resolution of the relief pattern can be obtained if the laser beam strikes 50 grooves of the grating profile 12; this means a diameter of the beam and of the grating profile area of 50 × 100 micrometers, which equals 5 millimeters. One may then measure the intensity of these first and second order beams 24 and 26, $I_1$ and $I_2$, respectively, by utilizing photodetectors placed at the appropriate diffraction angles $\theta_1$ and $\theta_2$ to receive the first and second order beams 24 and 26, respectively.

A part of the light beam 18 which strikes the diffraction grating profile 12 is reflected from the top surface thereof while other parts (not shown) of the beam 18 enter the portions of the epitaxial layer 20 beneath the top surface thereof, and then go through one or more internal reflections before emerging therefrom. The measured intensity of the diffracted beams is a result of the interference of these partial beams. As the silicon deposits on this relief pattern, the aspect groove width A thereof continually changes, which results in a change in the intensity of the diffracted beams as a result of the changing interference of the diffracted and reflected beams as the aspect groove width A decreases.

After measuring the intensity of the first order beam 24 and the second order beam 26, $I_1$ and $I_2$, respectively, one next obtains a ratio signal $(I_2/I_1)$, typically by means of an electronic analog divider, comprising the second order beam intensity divided by the first order beam intensity. For a rectangular diffraction grating profile 12, the aspect groove width A is a function of this ratio signal $(I_2/I_1)$ and is then determined by processing means utilizing, in the present example, the approximation $A = d/\pi \, \mathrm{Cos}^{-1} \sqrt{I_2/I_1}$ where d is the known periodicity of the diffraction grating profile 12 which is measured microscopically initially and remains constant throughout the deposition process. Such processing means may simply comprise a microprocessor which is interfaced with the system to receive the ratio signal $(I_2/I_1)$ and is programmed to determine therefrom the aspect groove width A in accordance with the above relationship.

Referring to FIG. 3, the thickness T of the depositing layer 20 may now be determined at a particular point in time from the relationship $T = (A_o - A)/2$. This relationship follows from the fact that after conformal deposition of the epitaxial layer 20 of thickness T on the diffraction grating profile 12, the aspect groove width A is reduced from the initial value $A_o$ to $A = A_o - 2T$, while the depth remains the same. The aspect groove width $A_o$ is initially measured microscopically along with the periodicity d. Consequently, the thickness T of the depositing layer 20 may be continually monitored during deposition by continually measuring the beam intensities $I_1$ and $I_2$ in order to obtain the ratio signal $(I_2/I_1)$, from which the aspect groove width A is determined at a particular point in time using the above relationship for a rectangular relief pattern. Since the aspect groove width A becomes zero for $T = A_o/2$, $A_o$ should have a value at least twice as large as the thickness T of the depositing layer 20. For example, a typical power device with an epitaxial layer having a thickness of about 80 micrometers would require an initial aspect groove width $A_o$ of at least 160 micrometers.

Figure 4:
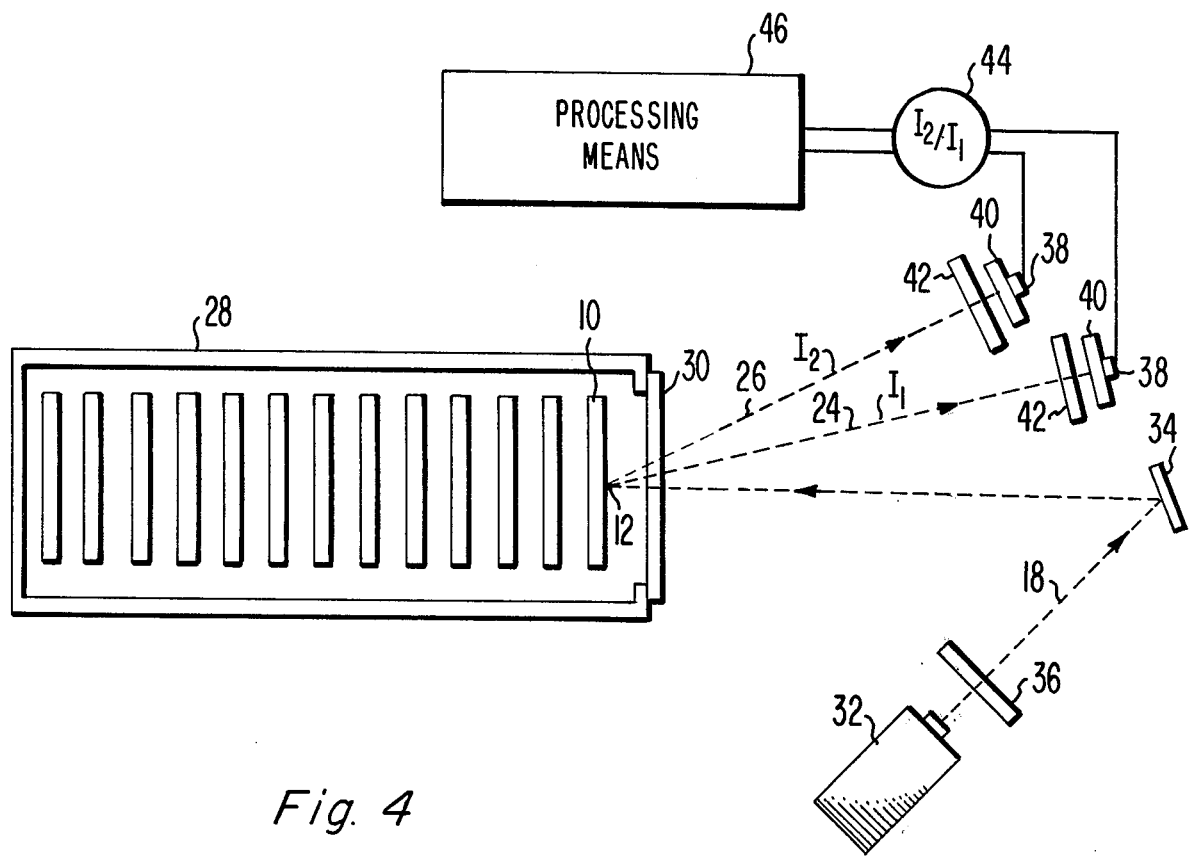
FIG. 4 is a diagrammatic plan view illustrating one embodiment of an apparatus utilized to practice the present novel method.

Referring to FIG. 4, there is shown one embodiment of an apparatus utilized to practice the present novel method. A body 10, having the diffraction grating profile 12 formed thereon, is placed in a chemical vapor-deposition chamber 28 having a plane parallel transparent window 30 on one side thereof, which enables the body 10 having the diffraction grating profile 12 thereon to be exposed to the light beam 18 while the depositing is in progress, in accordance with the previously described method. The window 30 has to be of reasonable optical perfection. In the present example, the window 30 comprises a transparent quartz glass, while the chamber 28 is a rotating disc reactor.

A monochromatic light source such as, for example, a He-Ne laser 32 is positioned so that the beam 18 of light therefrom strikes the diffraction grating profile 12 of the body 10 at an angle perpendicular to the plane of the diffraction grating profile 12 by utilizing a tiltable mirror 34, as shown in FIG. 4. In order to be able to have the delicate optical and electronic set-up far away from the reaction chamber 28, the light beam 18 of the laser 32 is expanded to a diameter of about 5 millimeters, which is small enough for testing and yet allows collimation over a distance of several meters without the use of additional lenses. Preferably, a chopper 36 is also utilized, which, in the present example, chops the light beam 18 at about 26 hertz. By utilizing a chopper 36, the background noise is reduced when a lock-in amplifier is tuned to pick up only the AC signal generated by the chopped light beam 18.

Also shown in FIG. 4 is means for measuring the intensity of the diffracted first order and second order beams 24 and 26 to obtain intensity measurements reflecting variations in the intensity of the diffracted beams 24 and 26 while the depositing is in progress. The intensity of the diffracted beams 24 and 26 is measured by utilizing photodetectors 38 placed at the appropriate angular positions to receive the diffracted beams 24 and 26. In the present embodiment, the photodetectors 38 comprise silicon PIN diodes (reverse biased at 10 volts), which are used in conjunction with lock-in amplifiers (not shown) to generate a signal with reduced background noise. The photodetectors 38 may be mounted on screens 40 having X-Y manipulators. This allows one to position the photodetectors 38 in order to be in line with the first order and second order diffracted beams 24 and 26. In order to exclude the scattered light it is desirable to also utilize shields 42 with small apertures therein having a diameter of about 5 millimeters. These shields 42 are positioned in front of the screens 40 so that the apertures therein allow basically only the first order and second order beams 24 and 26, respectively, to pass therethrough. In the present embodiment, the two intensity measurements $I_1$ and $I_2$ are put through an electronic analog divider 44 to obtain the ratio signal $(I_2/I_1)$. This ratio signal is then transmitted to processing means 46 for determining the aspect groove width A. Such processing means 46 may simply comprise a microprocessor which is interfaced with the system to receive the ratio signal $(I_2/I_1)$ and to determine the aspect groove width A in accordance with a pre-established relationship.

Although the present embodiment discloses the use of a rectangular relief pattern for the diffraction grating profile, since it is particularly simple to fabricate and to analyze, other shapes of periodic grating profiles may be utilized, albeit more difficult to make and requiring more mathematics for interpretation. Furthermore, a non-rectangular profile will give a decrease of the grating depth with layer thickness, not only of the groove width; this may be an advantage. Such an analysis would also have to be modified for non-conformal growth. In a practical case, it will be necessary to investigate the detailed change of grating shape as a layer is growing and to calibrate the optical measurements for a given set of growth conditions. Also, the present diffraction grating profile may be extended from a linear relief pattern into a two-dimensional relief pattern, e.g., a two-dimensional array of pits. This is attractive for the preferred orientation of wafers utilized for power devices, namely (111). Etching through a mask with such an array of holes would result in an array of triangular pits with all (111)-oriented faces, which may result in especially reproducible growth conditions. The optical diffraction patterns from such a surface would be two-dimensional.

The present novel technique provides an objective and quantitative method for optically monitoring the thickness of a layer of material being deposited on a substrate which requires no microscopic observation and no touching of the substrate which may cause damage or contamination. The present method gives a continuous measurement of the actual layer thickness during growth, allowing one to change the doping gas at exactly the desired growth thickness and to terminate the growth at exactly the prescribed total thickness, independent of small variations in the temperature and in the gas flow rate. The present technique gives signals in terms of amplitudes which can easily be interfaced with a computer for an active, automatic control of the deposition process.

What is claimed is:

1. A method of optically monitoring the thickness of a layer of material being deposited on a substrate within a reaction chamber comprising the steps of:
   forming on a body a diffraction grating profile having an aspect groove width $A_o$ and a periodicity d,
   exposing said diffraction grating profile to a beam of monochromatic light while depositing said material on both said substrate and said diffraction grating profile within said reaction chamber, whereby said diffraction grating profile, including the material deposited thereon, functions as a relief pattern, diffracting said beam of monochromatic light into diffracted beams of various orders, said relief pattern having a changing aspect groove width A,
   measuring the intensity of the first order beam ($I_1$) and the second order beam ($I_2$) to obtain a ratio signal ($I_2/I_1$) comprising the second order beam intensity divided by the first order beam intensity,
   transmitting said ratio signal ($I_2/I_1$) to processing means for determining said aspect groove width A, whereby the thickness T of said layer being deposited is determined from a pre-established relationship dependent upon the aspect groove width A.

2. A method as recited in claim 1 wherein said diffraction grating profile is a rectangular relief pattern whereby said aspect groove width A is equal approximately to $A_o$ minus 2T, T being the thickness of said depositing layer, and wherein said processing means for determining said aspect groove width A utilizes the approximation $A = d/\pi \cos^{-1} \sqrt{I_2/I_1}$, whereby said thickness T at a particular point in time is determined from the relationship $T = (A_o - A)/2$.

3. A method as recited in claim 2 wherein said body comprises a portion of said substrate, and wherein said forming step is performed by photolithographically masking a surface of said substrate and etching rectangular grooves therein, said grooves having a periodicity d and a groove width $A_o$ having a value at least twice as large as the value of the thickness of said layer being optically monitored.

4. A method as recited in claim 3 wherein said beam of monochromatic light strikes said rectangular relief pattern uniformly at an angle acute to the plane of said relief pattern.

5. A method as recited in claim 4 wherein said measuring step is performed by utilizing photodetectors placed respectively at angular positions to receive said first order and said second order beams.

6. A method as recited in claim 5 wherein said photodetectors are silicon PIN diodes.

7. A method as recited in claim 1 wherein said beam of monochromatic light is a laser beam.

8. A method as recited in claim 1 wherein said substrate is a silicon wafer and wherein said depositing layer is an epitaxial layer of silicon.

* * * * *